United States Patent [19]
Brown

[11] 4,036,334
[45] July 19, 1977

[54] BRAKING MEMBER HAVING A PLURALITY OF COATING FINS

[75] Inventor: Peter William Brown, West Midlands, England

[73] Assignee: Girling Limited, Birmingham, England

[21] Appl. No.: 671,992

[22] Filed: Mar. 30, 1976

[30] Foreign Application Priority Data

Apr. 8, 1975 United Kingdom ............... 14276/75

[51] Int. Cl.² .................. F16D 65/807; F16D 65/827; F16D 65/847
[52] U.S. Cl. .................... 188/264 A; 165/86; 188/71.6; 192/113 A
[58] Field of Search .... 188/218 XL, 264 A, 264 AA, 188/71.6, 218 R; 192/107 R, 113 A; 165/86

[56] References Cited

U.S. PATENT DOCUMENTS

| | | | |
|---|---|---|---|
| 1,971,929 | 8/1934 | Burdick | 192/113 A |
| 2,136,472 | 11/1938 | Sinclair | 188/264 A |
| 2,464,754 | 3/1949 | Tack | 188/264 A |
| 2,563,769 | 8/1951 | Wyant | 188/218 R |
| 2,655,236 | 10/1953 | Bachman | 188/264 AA |
| 3,059,730 | 10/1962 | Nickell et al. | 188/264 A |
| 3,773,153 | 11/1973 | Smirl | 188/264 AA |
| 3,899,054 | 8/1975 | Huntress et al. | 188/264 A |

FOREIGN PATENT DOCUMENTS

| | | | |
|---|---|---|---|
| 1,579,979 | 8/1969 | France | 192/113 A |
| 191,119 | 5/1937 | Switzerland | 188/264 AA |

Primary Examiner—Trygve M. Blix
Assistant Examiner—Edward R. Kazenske
Attorney, Agent, or Firm—Scrivener, Parker, Scrivener and Clarke

[57] ABSTRACT

A rotatable braking member, for example a disc or a drum, for a vehicle brake is provided with a separate plurality of spaced cooling fins having a co-efficient of thermal conductivity higher than that of the braking member to dissipate heat to a flowable working medium within passages between adjacent fins, and at least some of the passages are substantially uninterrupted circumferentially with respect to the direction of rotation of the braking member.

24 Claims, 11 Drawing Figures

BRAKING MEMBER HAVING A PLURALITY OF COATING FINS

This invention relates to improvements in rotatable braking members for vehicle brakes of the kind provided with at least one braking surface with which a non-rotatable friction member is adapted to engage to apply the brake.

The maximum capacity of vehicle brakes of the dry type is determined by two factors, namely peak power absorption and average power absorption. Peak power absorption is related to the swept area of the rotatable braking member and average power absorption is related to the total cooling area in contact with atmosphere or other flowable working medium or cooling fluid The cooling area can be increased by using extended surfaces such as fins and air passages and its effectiveness may be increased by forced cooling, that is increasing coolant flow by a separate pump or fan. In known constructions the fins are integral with or cast onto the braking members and are of substantial weight and thickness.

According to our invention in a rotatable braking member of the kind set forth for a vehical brake the braking member has a cooling face spaced from and in direct heat transfer relationship with the braking surface, and is provided with a separate plurality of spaced cooling fins having a co-efficient of thermal conductivity higher than that of the braking member, and heat conducting mounting means for securing the fins to the braking member and for maintaining the fins in a relatively spaced relationship, the heat conducting means having a co-efficient of thermal conductivity higher than that of the braking member and providing a rigid heat transmitting connection between all the fins and the cooling face, and passages defined between adjacent fins, the fins being operative to dissipate heat to a flowable working medium within the passages, and at least one of the passages being substantially uninterrupted circumferentially with respect to the direction of rotation of the braking member.

Preferably all the passages into which the working medium can be forced in an inward direction are all substantially uninterrupted circumferentially so that, when the braking member is rotating, substantially no centrifugal head is generated. This ensures that the admission of the working medium into the said passages is substantially unopposed and there is substantially no tendency for the braking member to act as a fan. Thus, resistance to such admission is at a minimum. This in turn has the advantage that a working medium moving means, for example a pump or fan, for forcing the working medium inwardly into the said passages can be relatively smaller since the working medium is movable inwardly against a minimum of resistance only slightly greater than that which would be encountered if the braking member were stationary. Also the braking member is relatively quiet in operation since, by providing passages which are substantially uninterrupted circumferentially, a "siren like effect" is substantially avoided.

Since the fins are separate from the braking member itself they can be constructed from a material having good properties of heat conductivity. Furthermore, the thickness of the fins can be varied and the spacing between adjacent fins can be altered depending on the amount of heat to be dissipated. Normally, however, the fins will be packed relatively closely at a pitch which will not inhibit movement of the flowable working medium within the passageways, and the fins are as thin as possible compatible with ensuring that heat can be transmitted at the required rate and of maintaining sufficient rigidity for them to be handled, mounted and maintained in position. To avoid interferring with the boundary layer the spacing between the adjacent faces of adjacent fins should not be less than 0.010 inch. Preferably the spacing should not be greater than 0.125 inch. Also it is desirable that the fins should not exceed 0.050 inch in thickness since no improvement in performance is achieved and thus the space in which additional fins could be accommodated is wasted. Preferably the fins are substantially 0.010 inch thick but in one practical construction they are 0.020 inch thick. Of course, the thickness of the fins will depend upon the heat transmitting properties of the material from which they are constructed. For example, fins of aluminum have to be substantially twice the thickness of fins of copper, for the same heat flow.

The fins may be located in a spaced relationship normal to the axis of rotation of the braking member. Alternatively, at least when the rotatable braking member comprises an axially extending annular flange at the free outer end of a radial mounting flange, the fins are concentrically spaced with respect to the axis of rotation of the braking member.

The mounting means preferably may comprise elongate support members in the form of struts which extend through aligned opening in the fins, and the struts may comprise copper or aluminium bars, or heat tubes, or even the material of a braze between adjacent surfaces. When struts are provided the material of the struts has a co-efficient of thermal conductivity at least equal to that of the fins. When the fins are arranged between adjacent cooling faces of a pair of radial flanges, the struts are in heat transmitting contact with the cooling faces, and the struts assist in holding the flanges in a fixed spaced relationship. In such a construction the spacing of the fins is arranged depending upon the amount of heat to be dissipated. For example, the fins close to the cooling faces may be closer together than those at substantially the, mid-point in the lengths of the mounting means.

The fins may be force cooled by the use of a pump or fan adapted to force the working medium over the fins with a radially inward component. Conveniently air is forced by a ducted fan inwardly, for example over the fins located mid-way between the cooling faces, and expelled in a radially outwards direction from between the fans adjacent to the cooling faces, which fins may be more closely packed than those mid-way between the faces. This permits a substantial quantity of air to be forced between the more widely spaced and cooler fins relatively easily since substantially no centrifugal head has to be overcome. The air is then exhausted through the hotter more closely packed fins adjacent to the hotter cooling faces.

Some embodiments of our invention are illustrated in the accompanying drawings in which.

Figure 1:
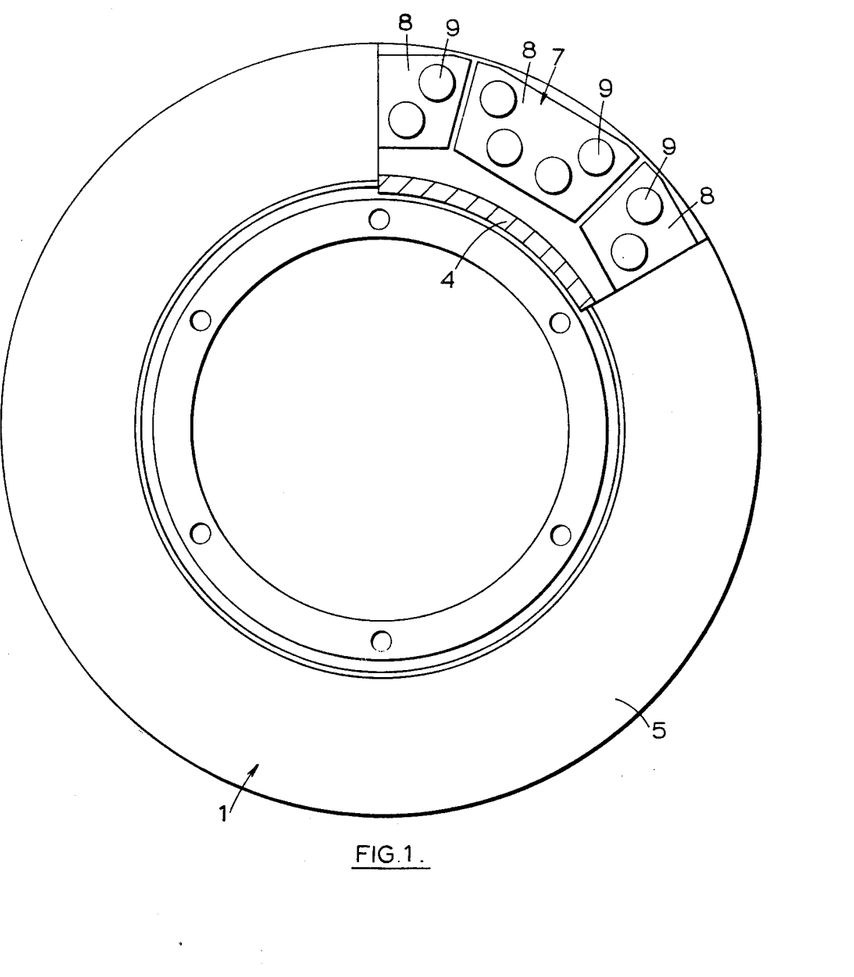
FIG. 1 is a side view of a disc for a vehicle disc brake including a section parallel to the plane of the disc.
Figure 2:
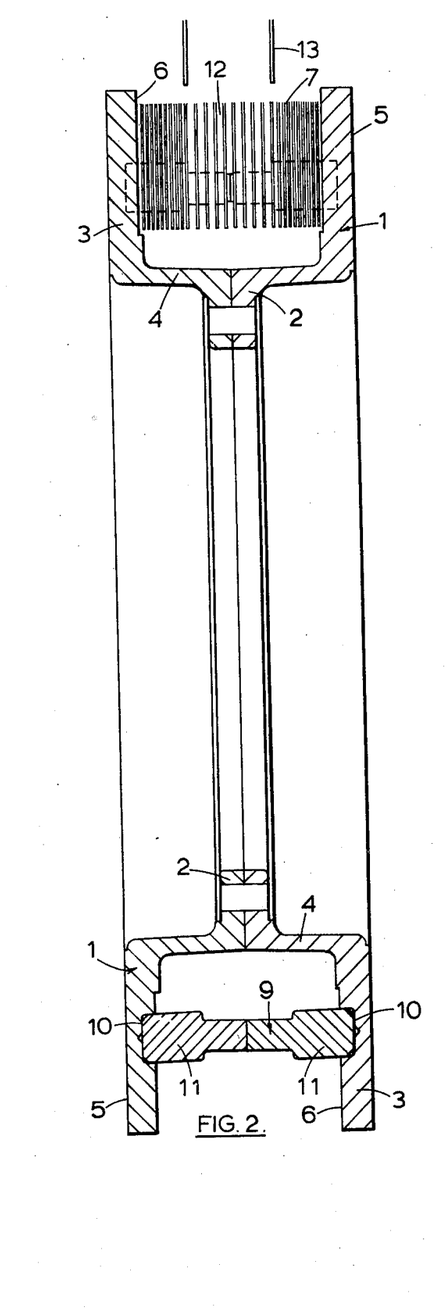
FIG. 2 is a transverse section through the disc of FIG. 1.

The disc illustrated in FIGS. 1 and 2 of the accompanying drawings comprises two annular cast iron rings 1 of generally Z-outline having an inner radial flange 2 integrally connected to an outer radial flange 3 by means of an axially extending annular web 4. The rings 1 are clamped together with their radially innermost flanges 2 in abutment and the flanges 3 spaced apart. The outer faces of the flanges 3 define annular braking surfaces 5 adapted to be engaged by friction members, and the inner faces 6 of the faces, which are adjacent to each other, comprise cooling faces.

A plurality of flat parallel-sided radial fins 7 are located in a tightly packed axial spaced parallel relationship between the flanges 3, parallel to the braking surfaces, and at right angles to the axis of the disc. Each fin 7 is of generally annular outline constructed by a series of individual fin parts which are of segmental outline and are disposed in a configuration with the ends of the fin parts 8 spaced by small distances from the adjacent ends of adjacent fin parts. Axially spaced fin parts 8 are superimposed upon each other and are mounted on common axially extending bars 9 which are received at opposite ends in recessess 10 in the cooling faces 6 of the flanges 3 with the bars 9 penetrating close to the braking surfaces 5.

The bars 9 comprise heat conducting mounting means for securing the fins 7 to the disc and for maintaining the fins 7 in a relatively spaced relationssip. The bars 9 may be constructed from a material which is different from that of the fins 7, but is preferably at least as good, if not a better, conductor of heat. Also the bars 9 act as struts to assist in maintaining the braking surfaces 5 in a fixed spaced relationship when the flanges are clamped against each other during actuation of the brake.

To facilitate manufacture and assembly each bar 9 is constructed in two parts 11 which abut at adjacent ends lying in a plane containing the abutting faces of the flanges 2. Each bar part 11 is of stepped outline with the ends of bar parts which are of greater diameter being received in the recesses 10, and the ends of the smaller diameter parts being in abutment. The spacing between the fins 7 which are carried by the bar parts of greater diameter is smaller than the spacing between the remainder of the fins 7 so that a greater quantity of cooling material is located against the hotter regions, namely the cooling faces 6.

The fin parts 8 are constructed from aluminium or, preferably copper, and the bars 9 are also of cooper or, alternatively may comprise heat tubes. In a modification the bars 9 may be hollow and filled with sodium.

The fin parts 8 are relatively thin, so not exceed 0.050 inch in thickness and preferably, are substantially 0.010 inch thick, although in one construction to simplify manufacture and handling they are 0.020 inch thick.

Passageways 12 defined between adjacent fins 7, and between the cooling faces 6 and the adjacent end fins 7, are not less than 0.010 inch in width and preferably not more than 0.125 inch. In fact, only the fins 7 which are carried by the bar parts 11 of greater diameter are spaced apart by distances approaching 0.010 inch.

The passageways 12 are substantially uninterrupted circumferentially and can be exposed to any convenient flowable working medium for cooling the fins 7 and force circulated therethrough by means of a pump or fan. Preferably the cooling medium comprises air which is directed inwardly on the centre fin parts 8 carried by the bar parts of smaller diameter through a duct 13 by means of a fan housed within the duct 13 and the inner end of the duct 13 may be extended circumferentially for a substantial distance in both directions.

The air is forced between the centre fin parts 8 easily against substantially no centrifugal head, since the passages between the adjacent fins 7 are substantially uninterrupted circumferentially, and exhausts through the more tightly packed hotter fins 7 adjacent to the cooling faces 6 which are hotter, with that flow augmented by the centrifugal force.

The air may exhaust from between the fins 7 at any convenient position, for example at opposite ends or sides of the duct 13. In a modification the duct may be continuous and enclose the whole of the circumferential length of at least the centre fins parts 8 which has the additional advantage of protecting the fins 7.

This provision of the high conductivity cooling fins 7 closely linked to the braking surface by means of the bars 9 provides a large cooling area in contact with the cooling faces which, in turn, are integral with and in direct heat transfer relationship with the braking surfaces 5.

In a modification a further annular support member comprising a relatively thin metal plate is clamped between the mating faces of the radial flanges 2. The plate is formed with a series of angularly spaced openings which receive and link together the abutting inner ends of the parts 11 of each bar 9. This obviates any tendency for the parts 11 of the bars 9 to move outwardly in a radial direction at their adjacent ends, which otherwise might cause the fins 7 to be overstressed, particularly when the disc is subjected to high rotational speeds.

Figure 3:
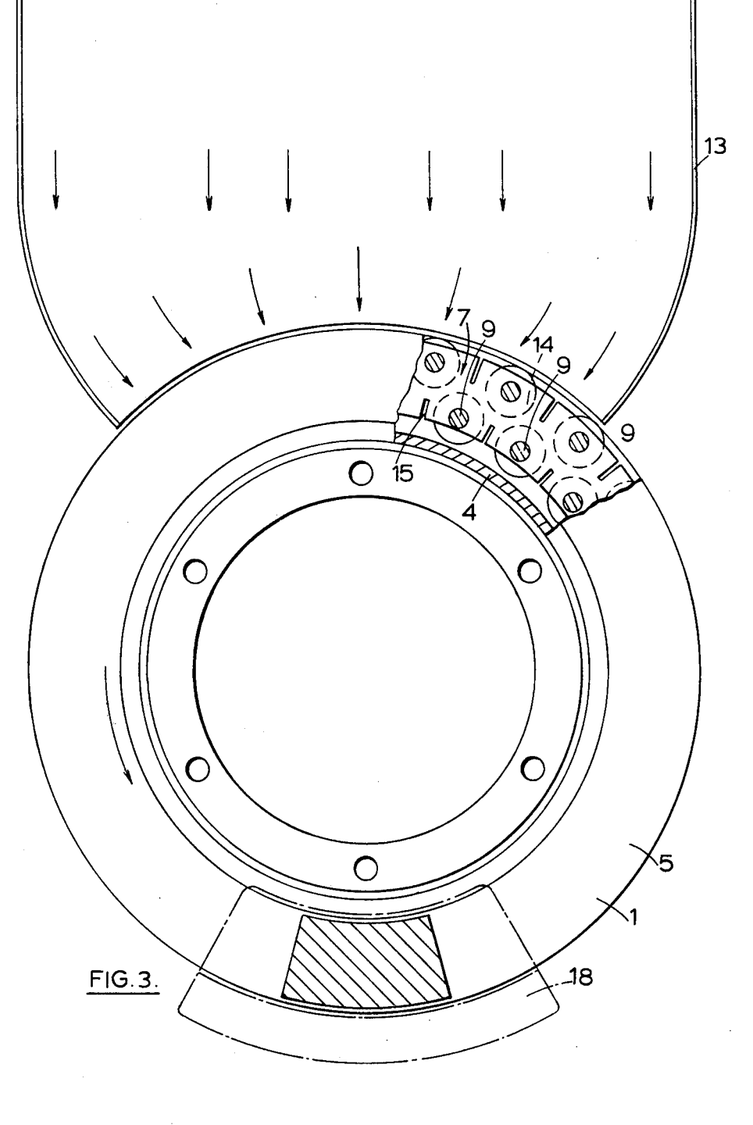
FIG. 3 is a side view of a second disc similar to FIG. 1 and also including a section parallel to the plane of the disc.
Figure 4:
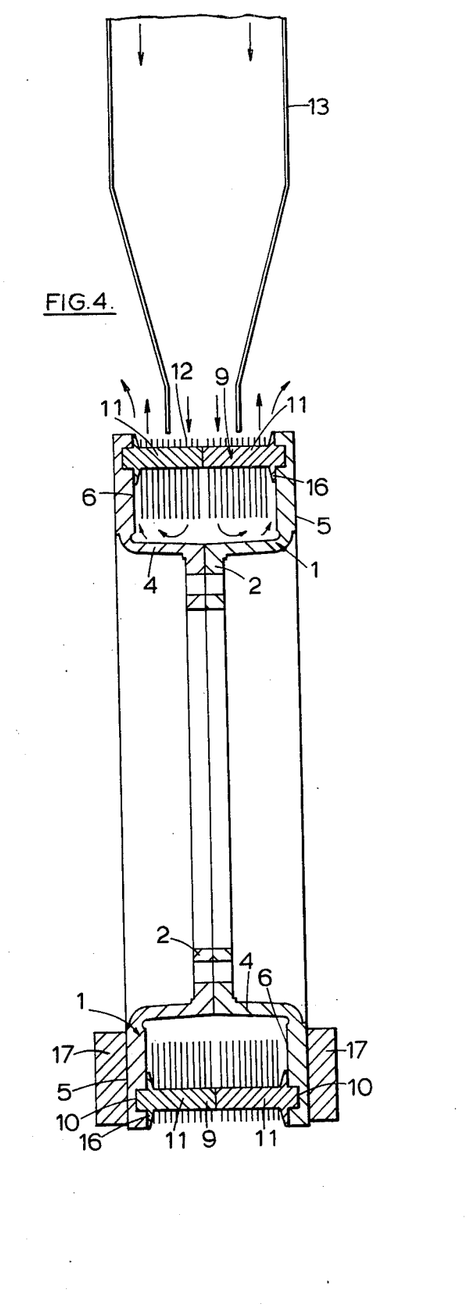
FIG. 4 is a transverse section through the disc of FIG. 3.

In the construction of FIGS. 3 and 4 the fins 7 comprise continuous annular rings 14 which are slotted at 15 in their innermost and outermost edges at positions between adjacent bars 9 to relieve thermal stresses.

The bars 9 are again each constructed in separate bar parts 11 but the bar parts 11 are all equal in diameter except that they are provided adjacent to their outer ends with enlarged heads 16 in engagement with the inner faces of the flanges 3 to facilitate heat transfer. Friction pads 17 for engagement with the braking surfaces are located in a brake caliper 18 straddling the peripheral edge of the disc.

The construction and operation of the embodiment of FIGS. 3 and 4 is otherwise the same as that described above and corresponding reference numerals have been applied to corresponding parts.

Figure 5:
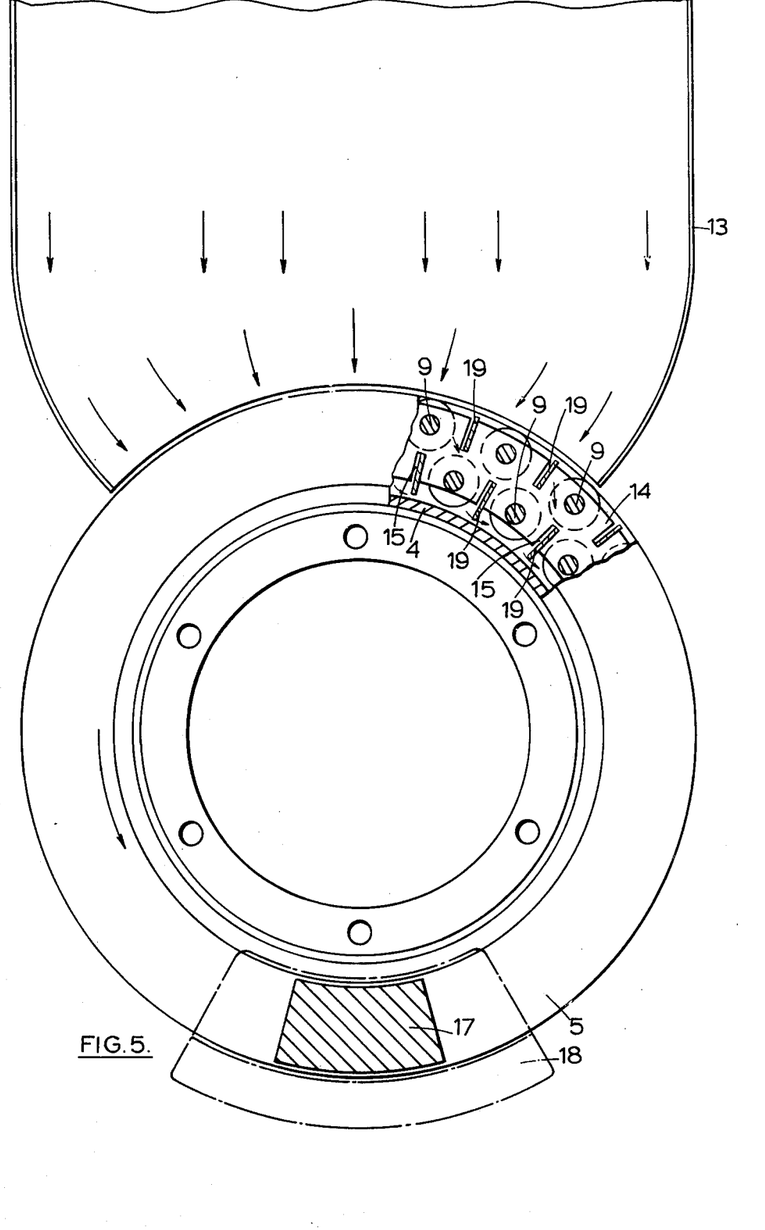
FIG. 5 is a view similar to FIG. 3 but showing a modified fin.
Figure 6:
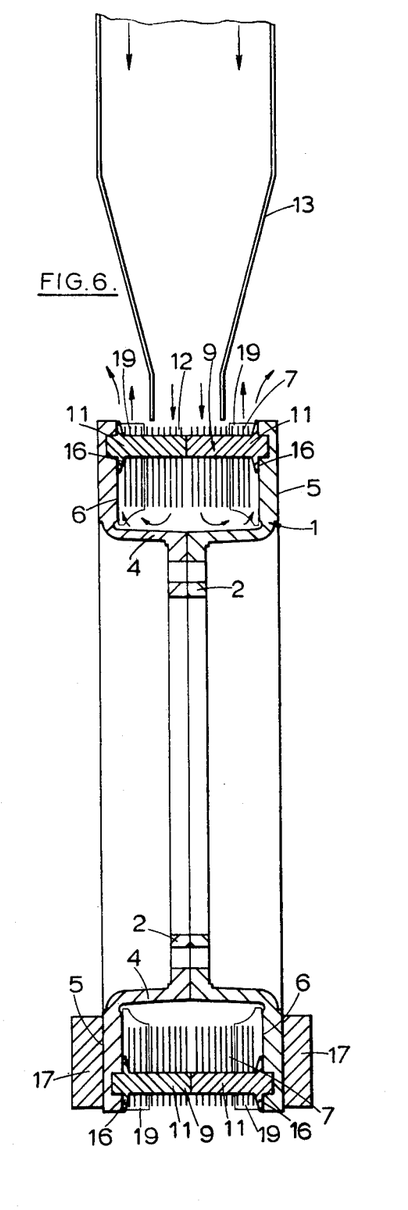
FIG. 6 is a transverse section through the disc of FIG. 5.

In the embodiment of FIGS. 5 and 6 the slots 15 in the rings 14 which are adjacent to the cooling faces 6 accommodate flat axially extending auxiliary fins 19.

When the disc is rotating the fins 19 create a pressure head or depression which evacuates the radially innermost parts of the passageways to increase the withdrawal of air and discharge the air at the outlet to assist in contra-flow against the centrifugal effect, as described above.

The construction and operation of the embodiment of FIGS. 5 and 6 is otherwise the same as that of FIGS. 3 and 4, and corresponding reference numerals have been applied to corresponding parts.

Figure 7:
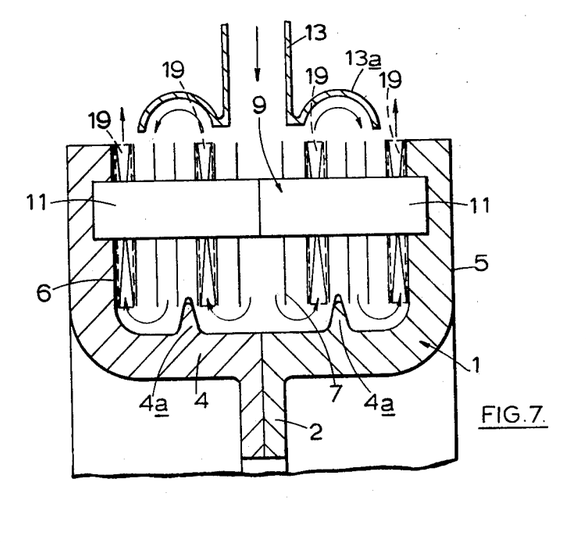
FIG. 7 is a portion of the section of FIG. 6 but showing a modification.

In the construction of FIG. 7 axially extending fins 19 are located between alternative pairs of the fins 7, and the inlet duct 13 is provided with a circumferentially extending skirt 13a which also extends axially in both directions and acts as a deflector to redirect exhausted air inwardly back into passages defined between adjacent fins. Also the inner end of the web 4 may be provided with circumferentially extending ribs 4a located between the fins 7 which are outwardly located in an axial direction with respect to the innermost fins 19. The ribs 4a facilitate the flow of air in an outward direction before re-introduction by the skirt 13a.

The provision of the skirt 13a ensures that the air is progressively heated before discharge to atmosphere, so that more work is done by the air. Thus the same cooling effect can be achieved by a smaller volume of air subjected to a higher temperature.

Figure 8:
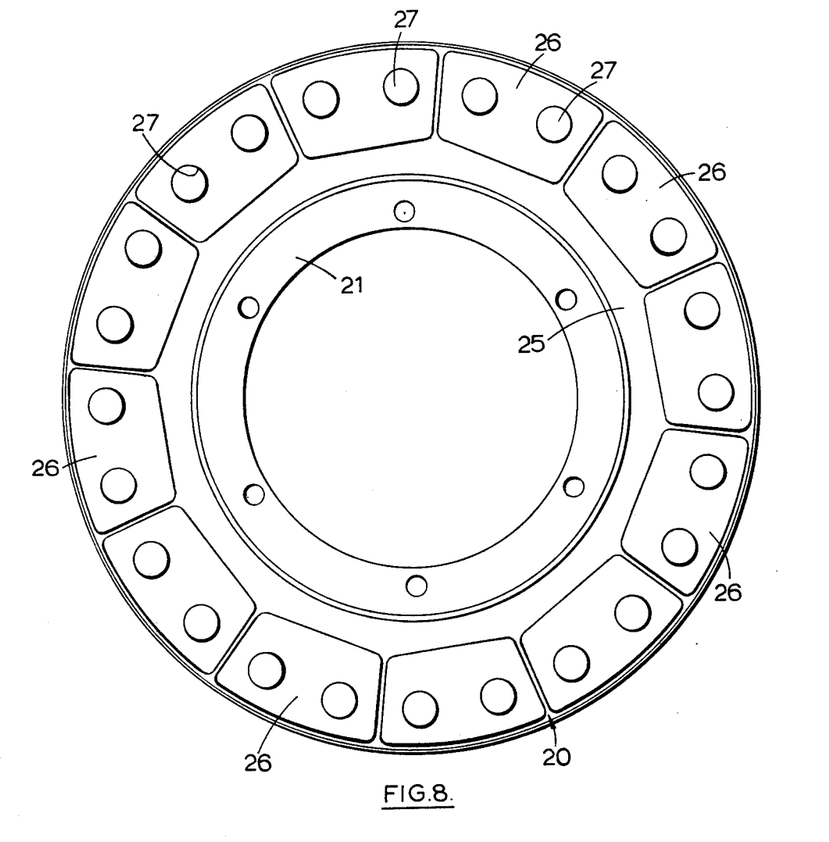
FIG. 8 is a side view of a disc having a single braking surface.
Figure 9:
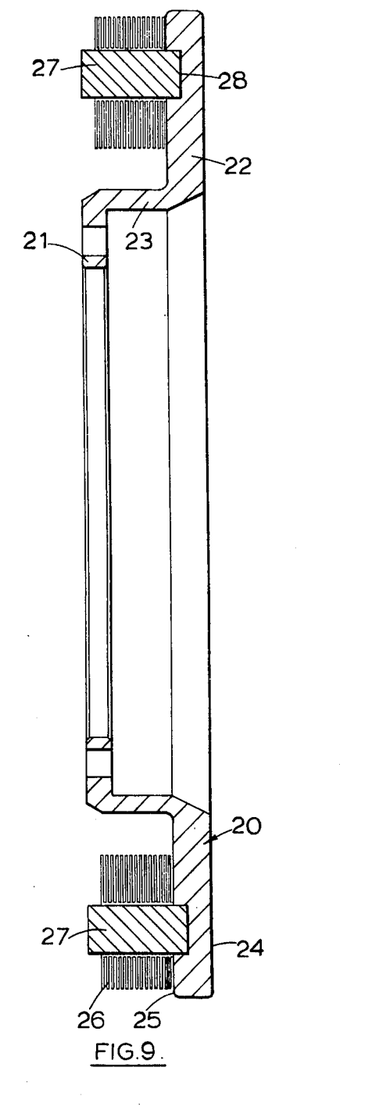
FIG. 9 is a transverse section through the disc of FIG. 8.

The embodiment of FIGS. 8 and 9 shows a brake disc in the form of a single cast iron ring 20 having an inner radial mounting flange 21 integrally connected to an outer radial flange 22 by means of an axially extending annular web 23. The outer face 24 of the flange 22 remote from the flange 21 comprises a braking surface and the opposite inner face 25 constitutes a cooling face.

A plurality of relatively thin radial fins 26 are located in a spaced parallel tightly packed relationship adjacent to the cooling face 25 on angularly spaced axially extending bars 27 to which are secured the fins 26 and which are fixedly received at corresponding ends in recesses 28 in the working face 25. The bars 27 are circular in section and are of a constant diameter through their lengths. As in the embodiment of FIGS. 1 and 2 the fins 26 comprise a plurality of individual fin parts 28 which are of segmental outline and which are disposed in a configuration with the ends of the fin parts 28 spaced by a small distance from the adjacent ends of adjacent fin parts.

In a modification the free ends of the bars 27 can be ground flat with the outer face of the flange 21 so that two such discs can be clamped together with the ground faces in engagement to form a double-sided disc of the kind described above.

Figure 10:
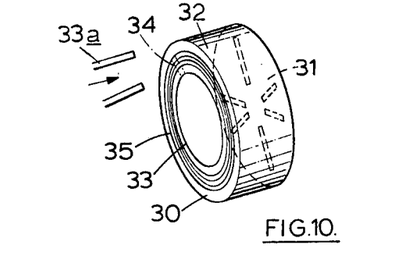
FIG. 10 is a perspective view of a rotatable drum for a vehicle shoe-drum brake.

The brake drum illustrated in FIG. 10 for a shoe-drum brake comprises an annular braking flange 30 which extends axially to one side of a plurality of relatively thin radial spokes defining an apertured torque carrier 31. The radially outermost face of the flange 30 comprises a braking surface 32 for engagement by arcuate brake shoew, or a band, and a plurality of relatively thin closely packed radially spaced fins 33 are concentrically arranged around the axis of the drum. The fins 33 may be continuous but, in order to conserve material and eliminate thermal stresses, they are preferably discontinuous.

The fins 33 are rigidly secured conveniently by brazing to the inner face of the torque carrier 31. Alternatively or in addition, the fins 33 may be carried from the cooling face 35 held in a suitable spaced relationship by means of radially arranged heat transmitting struts of which one is shown at 34 and which conveniently are similar in construction to the bars of the preceding embodiments.

In this construction heat may be transmitted to the fins 33 both through the brazes, which constitute the mounting means, and or through the struts 34.

In operation air is forced into circumferentially uninterrupted passages between the fins through a 33a parallel with the axis of the drum, and is exhausted through the torque carrier.

Figure 11:
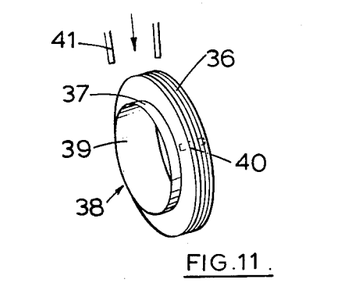
FIG. 11 is a perspective view of a modified drum for a shoe-drum brake.

In the brake drum illustrated in FIG. 11 axially spaced cicumferentially extending continuous or discontinuous fins 36 extend radially in an outwards direction from the outer cooling face 37 of an annular braking flange 38 to which they are secured by brazing, and the inner face of the flange 38 constitutes the braking surface 39 which is adapted to be engaged by arcuate brake shoes.

Axially extending rods, of which one is shown at 40, may be provided to assist in maintaining the axial spacing between adjacent fins.

In operation air is forced into passages between the fins through a radially located duct 41.

I claim:

1. A rotatable braking member for a vehicle brake, the braking member having a braking surface for engagement by a non-rotatable friction member, and a cooling face spaced from and in direct heat transfer relationship with said braking surface, a plurality of spaced cooling fins separate from said braking member and arranged adjacent to said cooling face in a relatively spaced relationship, said cooling fins having a co-efficient of thermal conductivity higher than that of the braking member, and heat conducting mounting means for securing said fins to said braking member and for maintaining said fins in said relatively spaced relationship, said heat conducting mounting means having a co-efficient of thermal conductivity higher than that of the braking member and providing a heat transfer connection between all said fins and said cooling face, and said heat conducting mounting means comprising a plurality of individual angularly spaced struts which are separate both from said fins and said braking member, said struts being secured to said fins and each of said struts having an end in direct heat exchange relationship with said cooling face, and passages defined between adjacent fins, said fins being operative to dissipate heat to a flowable working medium within said passages, and at least one of the passages being substantially uninterrupted circumferentially with respect to the direction of rotation of said braking member, braking forces being transmitted through said braking member independently of said struts.

2. A rotatable braking member as claimed in claim 1, wherein substantially all said passages are uninterrupted circumferentially with respect to the direction of rotation of said braking member.

3. A rotatable braking member as claimed in claim 1, wherein said fins are located in a spaced parallel relationship normal to the axis of rotation of said member.

4. A rotatable braking member as claimed in claim 1, comprising a radial flange of which opposite sides constitute said braking surface and said cooling face respectively.

5. A rotatable braking member as claimed in claim 1, wherein said fins are relatively thin and are closely spaced with respect to each other.

6. A rotatable braking member as claimed in claim 1, wherein said fins comprise individual members of sheet metal of constant thickness.

7. A rotatable member as claimed in claim 1, wherein said fins are made of highly conductive material.

8. A rotatable braking member as claimed in claim 7, wherein said fins are made of copper.

9. A rotatable braking member as claimed in claim 7, wherein said fins are made of aluminium.

10. A rotatable braking member as claimed in claim 1, wherein said fins are discontinuous.

11. A rotatable braking member as claimed in claim 1, wherein said fins do not exceed 0.050 inch in thickness.

12. A rotatable braking member as claimed in claim 1, wherein said fins are substantially 0.010 inch thick.

13. A rotatable braking member as claimed in claim 1, wherein said fins are 0.020 inch thick.

14. A rotatable braking member as claimed in claim 1, wherein said passages are not less than 0.010 inch in width.

15. A rotatable braking member as claimed in claim 1, wherein said passages do not exceed 0.125 inch in width.

16. A rotatable braking member as claimed in claim 1, wherein the braking member is made of cast iron, and said struts are brazed to said cooling face, said fins being brazed to said struts.

17. A rotatable braking member as claimed in claim 16, wherein said struts comprise heat pipes.

18. A rotatable braking member for a vehicle brake comprising axially extending hub portions, means for clamping said hub portions into engagement, a pair of axially spaced radial flanges extending radially outwards from said axially extending hub portions, inner adjacent faces of said flanges constituting axially spaced cooling faces and outer faces of said flanges constituting spaced braking surfaces for engagement by non-rotatable friction members, a plurality of spaced cooling fins having a co-efficient of thermal conductivity higher than that of said braking member and disposed between said cooling faces, and heat conducting mounting means for securing said fins to said braking member and for maintaining said fins in a relatively spaced relationship, said heat conducting means having a co-efficient of thermal conductivity higher than that of said braking member and providing a heat transmitting connection between all said fins and said cooling faces, said mounting means comprising angularly spaced axially extending struts which are secured to said fins with said struts being clamped at opposite ends between and in heat exchange relationship with said cooling faces, and said struts act to maintain said braking surfaces in a spaced parallel relationship, and passages defined between adjacent fins, said fins being operative to dissipate heat to a flowable cooling medium within said passages, and at least one of the passages being substantially uninterrupted circumferentially with respect to the direction of rotation of said braking member.

19. A rotatable braking member for a vehicle comprising a pair of axially spaced radial flanges have adjacent inner faces which constitute axially spaced cooling faces and outer faces which constitute axially spaced braking faces for engagement by non-rotatable friction members, a plurality of spaced cooling fins having a co-efficient of thermal conductivity higher than that of said braking member and disposed between said cooling faces, and heat conducting mounting means for securing said fins to said braking member and for maintaining said fins in a relatively spaced relationship, said mounting means comprising angularly spaced axially extending struts which are clamped at opposite ends between and in heat exchange relationship with said cooling faces, said heat conducting means having a co-efficient of thermal conductivity higher than that of the braking member and providing a heat transmitting connection between all said fins and said cooling face, and passages defined between adjacent fins, said fins being operative to dissipate heat to a flowable working medium within said passages, and at least one of the passages being substantially uninterrupted circumferentially with respect to the direction of rotation of said braking member, wherein at least those of said fins which are located adjacent to both cooling faces are provided with auxiliary axially extending fins to provide a contra flow air when said braking member is rotating.

20. A rotatable braking member for a vehical brake, the braking member having a braking surface for engagement by a non-rotatable friction member, a cooling face spaced from and in direct heat transfer relationship with said braking surface, a plurality of spaced cooling fins having a co-efficient of thermal conductivity higher than that of said braking member, and heat conducting mounting means for securing said fins to said braking member and for maintaining said fins in a relatively spaced relationship, said heat conducting means having a co-efficient of thermal conductivity higher than that of the braking member and providing a heat transmitting connection between all said fins and said cooling face, and passages defined between adjacent fins, said fins being operative to dissipate heat to a flowable working medium within said passages, and at least one of the passages being substantially uninterrupted circumferentially with respect to the direction of rotation of said braking member, wherein said fins are concentrically arranged and are radially spaced with respect to the axis of rotation of said braking member, and wherein said mounting means comprise a plurality of angularly spaced radial struts which are secured to said fins and engage at corresponding ends against said cooling face.

21. A rotatable braking member for a vehicle brake, the braking member having a braking surface for engagement by a non-rotatable friction member, a cooling face spaced from and in direct heat transfer relationship with said braking surface, a plurality of spaced cooling fins having a co-efficient of thermal conductivity higher than that of said braking member, and heat conducting mounting means for securing said fins to said braking member and for maintaining said fins in a relatively spaced relationship, said heat conducting means having a co-efficient of thermal conductivity higher than that of the braking member and providing a heat transmitting connection between all said fins and said cooling face, and passages defined between adjacent fins, said fins being operative to dissipate heat to a flowable working medium within said passages, and at least one of the passages being substantially uninterrupted circumferentially with respect to the direction of rotation of said braking member, wherein said braking member is made of cast iron, and said mounting means comprise a plurality of struts which, are brazed to said cooling face, said struts being hollow and being filled with sodium, and said fins being brazed to said struts.

22. In combination for a vehicle brake: a rotatable braking member, and working medium moving means, said rotatable braking member having a braking surface for engagement by a non-rotatable friction member, a cooling face spaced from and in direct heat transfer relationship with said braking surface, a plurality of spaced cooling fins separate from said braking member and arranged adjacent to said cooling face in a relatively spaced relationship, said cooling fins having a co-efficient of thermal conductivity higher than that of said braking member, and heat conducting mounting means for securing said fins to said braking member and for maintaining said fins in a relatively spaced relationship, said heat conducting means having a co-efficient of thermal conductivity higher than that of the braking member and providing a heat transmitting connection between all said fins and said cooling face, and said heat conducting mounting means comprising a plurality of individual angularly spaced struts which are separate both from said fins and said braking member, said struts being secured to said fins and each of said struts having an end in direct heat exchange relationship with said cooling face, and passages defined between adjacent fins of which at least one is substantially uninterrupted circumferentially with respect to the direction of rotation of said braking member, said working medium moving means being arranged adjacent to said braking member to force a flowable working medium into said passages and over said fins, said fins being operative to dissipate heat to said working medium within said passages, and braking forces being transmitted through said braking member independently of said struts.

23. The combination member as claimed in claim 22, wherein said moving means comprise a ducted fan for moving air into said passages and over said fins.

24. The combination as claimed in claim 23, wherein said ducted fan forces air inwardly into said passages.

* * * * *